Jan. 5, 1965
G. D. DOUSETTE
3,164,300
BOTTLE TOP METERING DISPENSER AND MEANS FOR
LOCKING THE SAME ON A BOTTLE
Filed April 18, 1963
2 Sheets-Sheet 1
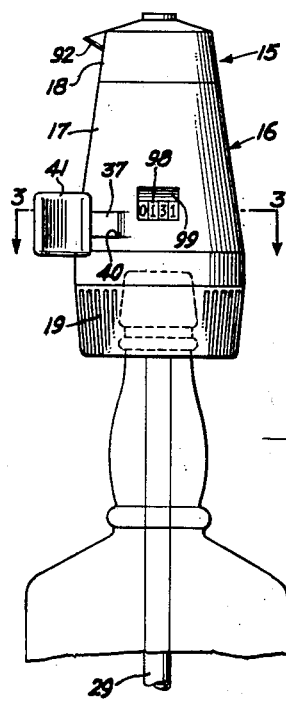
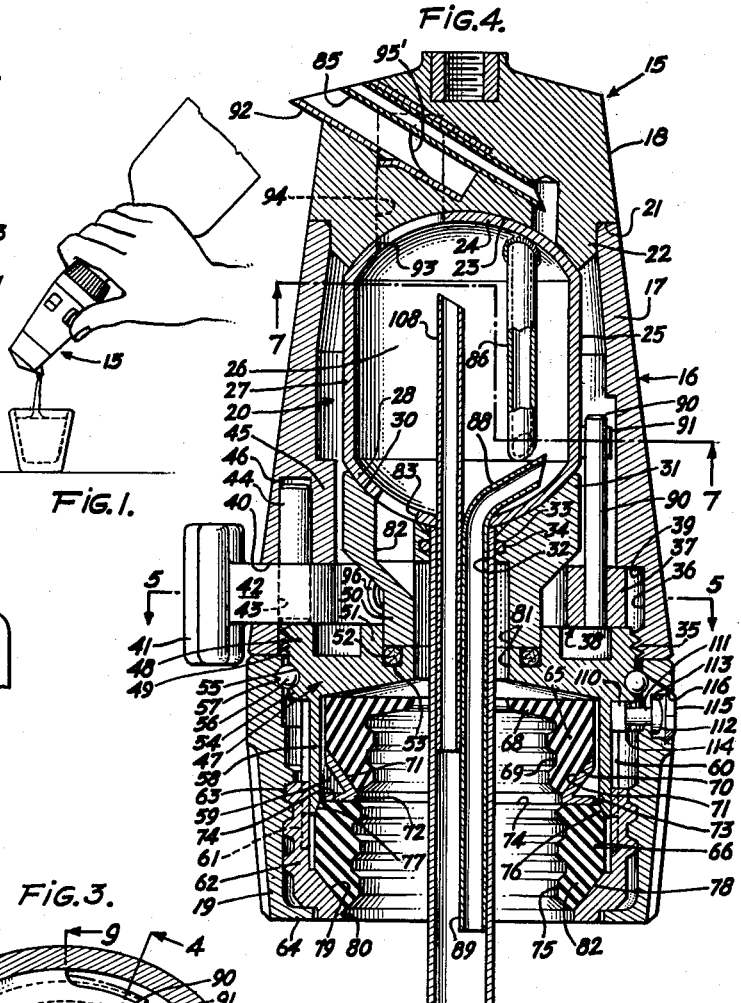
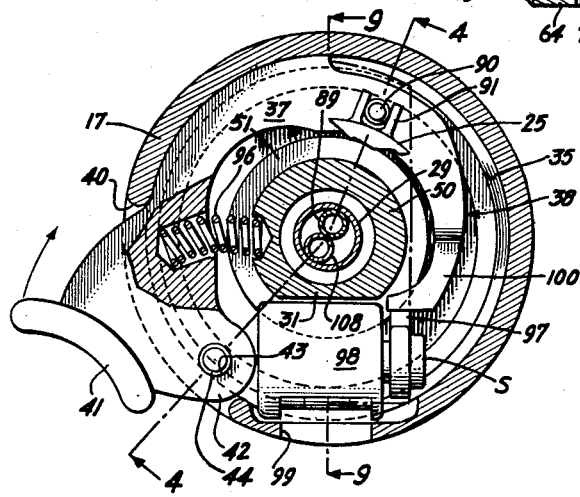
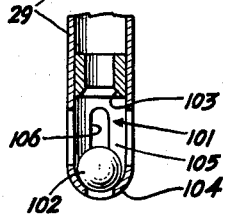
INVENTOR.
GEORGE D. DOUSETTE
BY Hansen and Lane
ATTORNEYS.

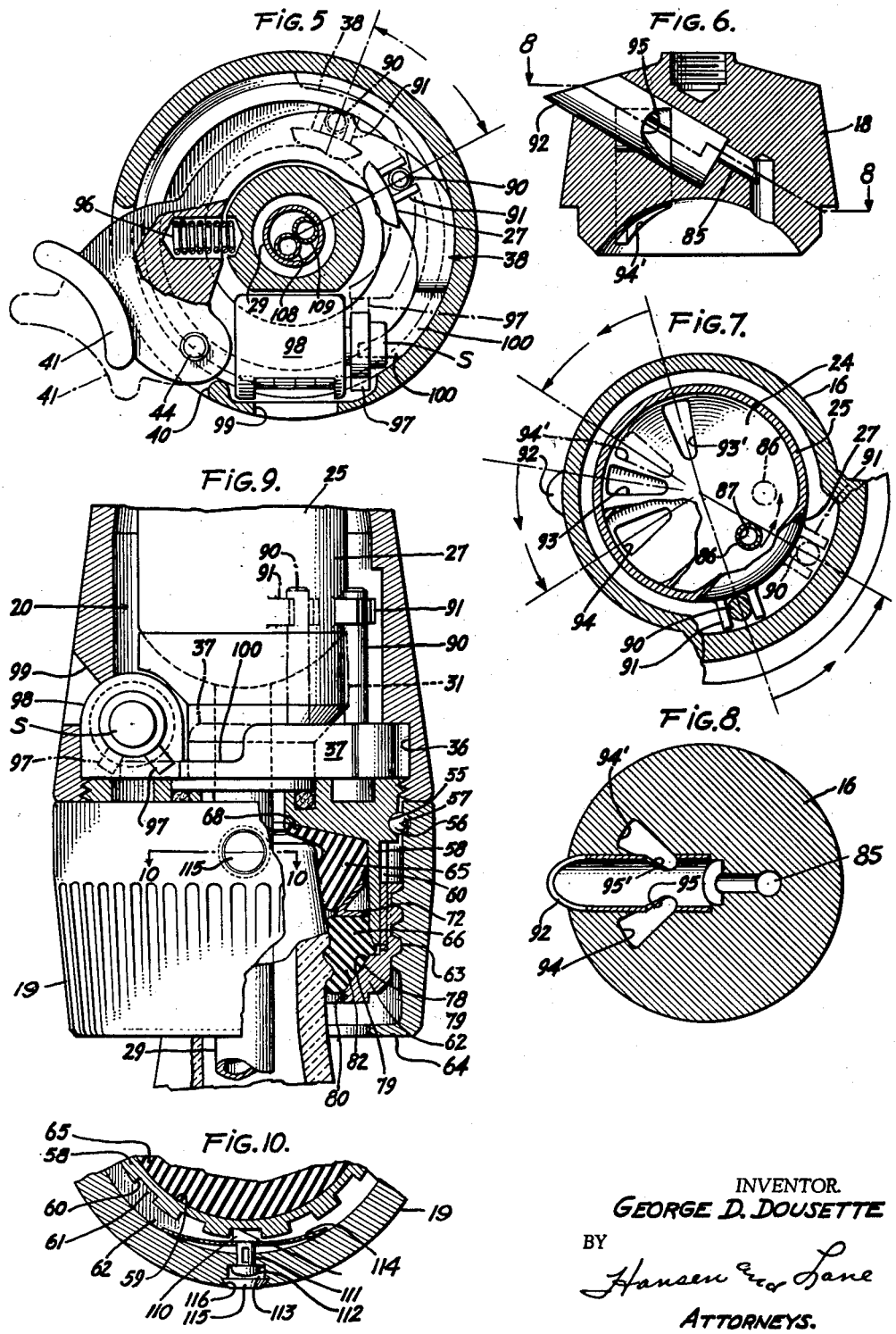

United States Patent Office 3,164,300
Patented Jan. 5, 1965

3,164,300
BOTTLE TOP METERING DISPENSER AND MEANS FOR LOCKING THE SAME ON A BOTTLE
George D. Dousette, 1749 Linnet Lane, Sunnyvale, Calif.
Filed Apr. 18, 1963, Ser. No. 274,042
13 Claims. (Cl. 222—153)

This invention relates to a liquid measuring and counting device in the nature of a cap or bottle top and means for locking the same onto a bottle top.

Numerous devices of this general character have been devised in the past. However, most of these prior known devices are quite complex and involve intricate mechanisms for accomplishing the ultimate result.

The present invention has as one of its objects the provision of a bottle top dispensing device in which the components are structurally related with the body of the device. In this connection it is another object to provide a dispensing bottle top embodying a minimum of parts correlated in a manner to facilitate operation by reason of the interrelation of the parts with one another.

It is another object to provide a device for isolating a predetermined quantity of fluid from the contents of a bottle.

It is another object to mount a measuring chamber or ported tank within the main body of the dispenser for segmental movement into and out of register with ports formed within the body for alternately admitting and discharging fluid from the measuring chamber.

It is yet another object to provide a main vent tube between the bottle and measuring chamber with a pressure equalizing tube and a drainage tube whereby to assure against a fluid lock between the bottle and the chamber during chamber filling operation. In this connection it is an object to provide a measuring chamber communicable with the interior of the bottle and means for facilitating equalization of the air pressure between the chamber and bottle whereby air from the chamber is transmitted to the bottle simultaneous with the transfer of fluid from the latter into the chamber It is another object to provide a novel sealing means between the neck and mouth of a bottle and the dispensing unit. This object contemplates the provision of a concealed safe lock for locking the dispensing unit upon the bottle neck to prevent unauthorized removal of the dispensing unit therefrom.

These and other objects and advantages of the present invention will become apparent from a reading of the following description and claims in the light of the drawings in which:

FIG. 1 is an illustration of the dispensing cap of the present invention in use.

FIG. 2 is an enlarged elevational view of the dispensing cap of the present invention.

FIG. 3 is a horizontal section through FIG. 2 taken along line 3—3 thereof and at larger scale with respect thereto.

FIG. 4 is a vertical section through FIG. 3 taken substantially along line 4—4 thereof.

FIG. 5 is a horizontal section through FIG. 4 taken substantially along line 5—5 thereof showing certain parts illustrated in FIG. 3 in a different position.

FIG. 6 is a detail section of the upper portion of FIG. 4 illustrating the pouring head only thereof.

FIG. 7 is a horizontal section through FIG. 4.

FIG. 8 is a sectional detail of FIG. 6 taken substantially along line 8—8 thereof.

FIG. 9 is a partial elevation and fragmentary section of the lower portion of the dispensing cap.

FIG. 10 is a fragmentary sectional detail taken along line 10—10 in FIG. 9.

Referring to the drawing the dispensing cap of the present invention, designated 15, has a body or casement 16 consisting of three principal parts, namely, a main body 17; a spout and venting unit 18 at the upper end of the body 17; and an attaching ring 19 rotatably associated with the lower end of the body 17.

The main body 17 of the casement is hollow and preferably of frusto conical shape exteriorly and cylindrical interiorly to provide a housing 20. The spout and venting unit 18 press fit and secured to the open upper end of the main body 17 by a suitable cement or other medium. It should here be noted although the unit 18 might well be formed integrally with the body 17 it is preferably separately molded. While the material from which these parts are to be made is optional it should be apparent that the parts may be die cast metal or molded plastic as desired.

The pouring and venting unit 18 is formed with an annular shoulder 21 for receiving the open upper end of the main body 17. A lower central portion 22 of the unit 18 extends into the housing 20 and has an inverted saucer like recess 23 for surface contact with a dome-like end 24 of a tank or bulb 25 having an internal chamber 26 for receiving and holding a measured quantity of fluid.

The side wall 27 of the tank 25 is cylindrical and the opposite end 28 thereof is of dome-like shape comparable to that of the upper end 24 thereof. A main vent tube 29 has its upper end secured to the dome shaped lower end 28 of the tank 25 so as to extend therefrom in axial alignment with the tank 25.

The lower dome shaped end 28 of tank 25 rests upon a saucer shaped surface 30 of a central bearing member 31. Adjacent the surface 30 the member 31 has a center bore 32 through which the main vent tube 29 extends. The internal wall of the bore 32 has an annular recess 33 formed therein in which is disposed an O-ring 34 for sealingly engaging the main vent tube 29.

The upper portion of the bearing member 31 is of comparable diameter to the tank 24 to facilitate full surface bearing between the recess 30 thereof and lower dome shaped end 28 of the tank 25. The lower portion 50 of the chamber 31 is of reduced diameter with respect to its upper end to provide space within the housing 20 for other components now to be explained.

The bottom open end of the main body 17 is provided with inside threading 35 and an adjacent annular area 36 dimensioned to receive and support an arm 37 of a lever 38 against a shoulder 39 formed in the spread open end of the body 17. Part of the lever 38 extends through an opening or slot 40 formed in the main body 17 and has a pad 41 formed thereon exteriorly of the body 17 for actuating the lever 38.

The lever 38 has a fulcrum portion 42 of a thickness comparable to that of the lever arm 37 and provided with a bore 43 through which a pin 44 is extendable. The main body 17 has an internal boss formation 45 in the region of fulcrum portion 42 provided with a bore 46 for receiving a portion of the pin 44 extending from the lever 38. Part of the internal threading 35 at the lower end of the body 17 is milled out to admit the pin 44 into the aligned bores 43 and 46.

An inner locking member 47 provides a bearing wall 48 having at its upper end external threading 49 which fits the inside threading 35 of the main body 17. The upper end of member 47 provides a ledge or shoulder for supporting the lever arm 38 within the annular space in which it is arranged. It will thus be noted that the lever arm 37 is guided in the annular, groove-like space 36 between the shoulder 39 and the upper ledge of the member 47, within the casement 16.

Centrally of the inner locking member 47 is an upwardly projecting ring like shoulder 51 for receiving the lower portion 50 of the bearing member 31 the lower end of which has sealing engagement with an O-ring 52 disposed in an annular groove 53 formed in the member 47. In this manner the bearing member 31 is pressed upwardly within the housing 20 so that the tank 25 is firmly but turnably mounted co-axially of the body 17 and between the saucer like recesses 30 and 23 of the upper unit 18 and lower bearing member 31, respectively.

Below the external threading 49 the inner locking member 47 has a depending annular face 54 in which is formed an annular groove 55. The previously mentioned attaching ring 19 has its open upper end disposed to surround the annular face 54 and to engage or bear against the bottom edge of the main body 17 of the casement 16. The attaching ring 19 is rotatably mounted upon and secured to the annular face 54 by means of a plurality of nylon balls 56 arranged in the groove 55 and extending into a comparable groove 57 formed on the inner face of the attaching ring 19.

The inner locking member 47 has a cylindrical portion 58 extending downwardly therefrom as an annular skirting to provide a cap-like internal cavity 59 for receiving the open top of a bottle. The outer surface of the cylindrical portion 58 is fluted vertically as at 60 (see FIG. 10) for interlocking relation with similar fluting 61 on the inner surface of a presser sleeve 62 the outer surface of which has threaded connection as at 63 with internal threads formed on the attaching ring 19.

The presser sleeve 62 is initially threaded into the attaching ring 19 from the open top thereof before the latter is secured to the inner locking member 47 by means of the nylon balls 56. The open bottom of the attaching ring 19 has an inwardly extending flange 64 which limits movement of the presser sleeve 62 therebeyond.

Also prior to securing of the attaching ring 19 to the inner locking member 47, a rubber sealing means is placed in the cavity 59. In the present disclosure the sealing means consists of two rubber seals 65 and 66 the upper one 65 of which is a mouth engaging cap having an inwardly extending flange lip 68 for overlying the upper rim of a bottle top. The internal wall of cap 65 is ribbed annularly as at 69 to engage the neck of a bottle. The lower end of the cap 65 has a diagonal face 70 flaring outwardly from the internal wall and engaging a funnel shaped surface 71 on a cam ring 72. The cam ring 72 has a washer like annular lower flange 73 which rests on the flat upper surface 74 of the lower rubber seal 66.

The lower rubber seal 66 has internal ribbing 75 for engaging the neck of a bottle. The upper, outer corner of the seal 66 is beveled as at 76 and has bearing engagement with a complementary inner bevel 77 on the open lower end of the cylindrical skirting portion 58 of the inner locking member 47. The lower end of the seal 66 has its outer corner beveled as at 78 and bearing against a complementary beveled cam surface 79 on an inwardly extending flange 80 of the presser sleeve 62. The lower integral flange 64 of the attaching ring 19 engages and supports the shouldered lower end 82 of the lower rubber seal 66. In this manner the outer attaching ring 19 is free to rotate relative to the presser sleeve 62 which is keyed by the interlocking vertical fluting 60–61 to the depending cylindrical skirting 58 of the inner locking member 47. Consequently, as the outer ring 19 is turned manually the threading 63 causes the presser sleeve 62 to advance, upwardly, as guided by the interlocking fluting 60–61. This causes the lower flange 80 on the presser sleeve 62 to rise so that its beveled upper cam surface 79 presses against the lower corner bevel 78 of the lower rubber seal 66 to compress the latter. The same upward pressure is transmitted to the cam ring 72 so that its funnel shaped flange 71 bears upwardly against the upper rubber seal 65 to compress the latter. The rubber sealing members 65 and 66 are thus distorted and since they are annularly confined can only swell inwardly to cause their internal ribbing 69–75 of the two rubber seals 65 and 66 to be pressed against the neck of a bottle to create a fluid tight seal relative thereto as illustrated in FIG. 9. Here too it will be noted that the open mouth of the bottle is pressed upwardly against the inwardly extending flange lip 68 of the cap 65 to create a fluid tight seal.

From the foregoing it will be appreciated that once the dispensing unit 15 is mounted on a bottle top the interior of the bottle is sealed against loss of fluid other than via the dispensing unit 15. Moreover, the open mouth of the bottle is in communication with the measuring chamber 26 of the tank 25 via a central passage 81 formed through the center of the locking member 47 and the reduced portion 50 of the bearing member 31. This passage 81 circumscribes the vent tube 29 which extends downwardly from the bearing member 31 and into the bottle. The passage 81 has an offset section 82 which bypasses the central seal 34 confined within the central bore 32 in the saucer like base 30 of the bearing member 31. The offset section 82 of passage 81 registers with a port 83 formed in the dome-like base 28 of the tank 25 to thereby admit fluid from the bottle into the measuring chamber 26 when the bottle and unit 15 are inverted as illustrated in FIG. 1.

Adjacent the lower end of the chamber 26 is the open upper end 88 of a pressure equalizing tube 89 which extends first radially of the chamber 26 and then down through the main vent tube 29. It will therefore be appreciated that when the bottle and dispensing unit 15 are inverted as in FIG. 1 fluid will flow by gravity from the bottle into the measuring chamber 26 of tank 25 as the air in the chamber 26 is vented back into the bottle via the pressure equalizing tube 89 to prevent a vacuum lock in the bottle and to displace the outgoing fluid with air.

When the tank is full of fluid the open end of the tube 89 within the tank becomes submerged and further back pressure upon the fluid in the bottle rendered impossible thus stopping further flow of fluid from the bottle into the chamber 26. Now when the pad 41 is pressed manually the lever arm 37 is rocked about pin 44 from the position shown in FIG. 3 to that shown in full lines of FIG. 5. The lever arm 37 carries an upstanding rod 90 which is disposed in a yoke 91 projecting from the side wall 27 of the tank 25. As the rod 90 is moved a segmental distance, from dotted to full line position FIG. 5, the yoke 91 and the entire tank assembly is turned a comparable segmental distance. This shifts the port 83 in the bottom dome-like base 28 of tank 25 out of register with the passage 81–82 in the fixed bearing member 31. This isolates the measuring chamber 26 from the interior of the bottle other than via the venting tube 89 and a drainage tube 108 later to be explained.

The contents of the tank 25 is now ready to be released for discharge via a pouring spout 92 in the spout and venting unit 18. This occurs via a pair of ports 93–93' formed at spaced radial positions in the dome-like top 24 of the tank 25. These ports were normally closed (see FIG. 7) but by reason of the segmental movement of the tank were shifted into register with a pair of passages 94–94' formed in the unit 18. Each of the passages 94–94' communicates with the pouring spout 92 via parabolical shaped openings 95–95' in the sides of the spout 92 (see FIGS. 6 and 8).

Other than these spout openings 94–94' and 95–95' the upper end 24 of the tank 25 is closed except where it communicates with a pouring vent passage 85 which extends diagonally through the spout and venting unit 18. The open lower end of this passage 85 is disposed diametrically opposite the spout so as to communicate with the upper end of a tube 86 which is welded to the dome-like upper end 24 of the tank 25 at an opening 87 formed therein. The tube 86 is normally out of register with the passage 85 when the tank 25 is in filling position, i.e. in communication with the bottle. The tube 86 extends down into the tank and its open end is disposed adjacent the upper end 88 of the pressure equalizing tube 89 in the region of the lower saucer like end 28 of the tank 25.

The vent tube 86 being movable with the tank is shifted into register with the vent passage 85 in the spout and venting unit 18 simultaneous with registration of the ports 93–93' with the passages 94–94' leading to the spout 92.

From the foregoing it will be appreciated that the measured quantity of fluid in the chamber 26 will now discharge from the same via the spout 92 and the chamber will be vented via the passage 85 and tube 86.

The reason for the segmental spacing of the passages 94–94' to either side of the spout 92 is to guard against unauthorized withdrawal of fluid therefrom. For example, it prevents anyone from pouring fluid by means of a wire to hold the ports 93–93' of the tank in partial register with the passages 94–94' and possibly adjusting the tank 25 to a position where its fluid admittance port 83 is partially in register with the by-pass section 82 of the passage 81 leading from the bottle.

Once the measuring chamber 26 of tank 25 is evacuated and the thumb actuated pad 41 is released, a spring 96, between the lever arm 37 and the stationary reduced section 50 of the bearing member 31 (FIG. 3), returns the lever 37 to normal position. Thus the tank 25 is rocked segmentally back into normal position wherein the admittance port 83 again registers with passage 81 and the exit ports 93–93' again assume blocked or closed condition at a blank spot on the upper saucer surface 23 of the spout and venting unit 18. With the bottle inverted as in FIG. 1 the tank 25 will again receive a measured quantity of fluid from the bottle and upon manual depression of pad 41 the fluid isolated in chamber 26 will be discharged via the pouring spout as hereinbefore explained.

From the foregoing it will be appreciated that each time the pad 41 and lever 37 is actuated a precise, accurately measured quantity of fluid will be dispensed from the bottle.

Each time the lever 37 is moved from tank filling to tank discharging position it actuates a lever 97 on a counting device 98 having digital dials visible through a sight opening 99 in the casement 16. The counter 98 is disposed in a plane substantially common to that in which the lever arm 37 is disposed (see FIG. 9). The terminal end 100 of lever arm 37 is of reduced thickness so as to pass beneath the shaft S of the counter 98. The lever 97 on the counter 98 is in the path of movement of the terminal end 100 of lever 37 so that each time the latter moves a full stroke (from dotted to full line position FIG. 5) the counter is stepped up one digit to record the fact that one measured quantity has been dispensed.

The main vent tube 29 is of such a length as to extend into the fluid in the bottle. The bottle end of the main vent tube 29 is provided with a one way valve 101 in the form of a ball 102 and ball valve seat 103. The ball seat 103 is disposed a slight distance, about two ball lengths, from the extreme end of the tube 29 and the latter is turned inwardly as at 104 to maintain the ball 102 within a space 105 for permitting the ball to become unseated from the valve seat 103. That portion of the tube 29 around the space 105 is provided with elongated ports 106 facilitating passage of air and fluid from the main vent pipe 29 into the bottle.

In FIG. 4 it will be noted that the bottle end of the bottle venting tube 89 terminates just below the flanged end 64 of the attaching ring 19. Moreover, the section of venting tube 89 disposed within the main venting tube 29 is on that side of the latter which is diametrically opposite the pouring spout 92. Thus it will be appreciated that when the bottle and unit 15 is inverted into pouring position as seen in FIG. 1, the bottle venting tube 89 is on the high side of the main vent tube 29. Consequently, should any fluid enter the main vent tube 29 from the bottle end thereof such fluid will by-pass the venting tube 89 on a drainage side thereof and run into the chamber 26. However, it should be noted that the ball 102 will gravitate onto the seat 103 immediately upon inversion of the bottle so only such fluid as might be standing within tube 29 before inversion would be captured therein. This would only happen when the bottle is full but after the fluid level therein recedes below the ball valve 101 it will not do so.

In order to check any venting of the measuring chamber 26 via the drainage side of the main vent tube 29 a drain tube 108 is disposed therein diametrically opposite the pressure equalizing tube 89 therein. This drainage tube 108 extends into the chamber 26 well above the inlet port 83 in the dome-like base 28. The opposite end of the drainage tube 108 is in the region of the sealing lip 68 for the open end of the bottle. By this arrangement any fluid possibly captured within the main vent tube 29 is immediately drained therefrom into the measuring chamber 26 simultaneously with the first flow of fluid into the same via the admission port 83. This clears the bottle end of the pressure equalizing tube of any possible obstruction by fluid and allows free flow of air from the chamber 26 into the main vent tube 29. As air pressure builds up within the tube 29 the ball 102 is unseated from seat 103 sufficiently to vent the bottle so that fluid readily flows therefrom into the chamber 26.

Since the dispensing unit 15 is connected to the bottle so as to keep a complete account for every measured quantity of fluid dispensed it will be appreciated that there is required some means for assuring against removal of the unit 15 from the bottle other than by a person authorized to do so. In the present disclosure (FIGS. 4 and 10) I have shown a one way locking plug 110 mounted in the attaching ring 19 for radial movement into and out of locking engagement with which ever one of the vertical flutes 60 as is exposed thereto on the depending cylindrical skirting 58 of the inner locking member 47. This locking plug 110 has a cam surface disposed to ride over the adjacent edge of a flute during turning of the ring 19 to tighten the threading 63 and jamming of the seals 65–66 onto the bottle. The plug 110 has a reduced shank 111 on which a leaf spring 114 is mounted for releasably urging the plug 110 toward the diluted surface of skirting 58. The shank 111 is keyed to maintain the cam face of plug 110 in proper position relative to the fluting 60. The opposite end of plug 110 has an enlarged head 112 disposed in an opening 113 in the side wall of ring 19 to facilitate withdrawal of the spring urged plug 110 when the unit 15 is to be removed from a bottle.

As the seals 65 and 66 are compressed into sealing condition on the bottle by turning of the attaching ring 19 relative to the skirting 58, the plug 110 is constantly locked against backward turning. A soft metal cap or cover 115 is forced into the opening 113 and held in place by the wedging of the edges of the cap 115 into the inward flared rim 116 of opening 113. The dispensing unit 15 is now safely locked upon the bottle and can only be removed by removal of the soft metal cover 115 from over the head 112 of the locking plug 110. This destroys or mutilates the cover 115 and thus apprise the proprietor of any unauthorized tampering or possible removal of the dispensing unit from the bottle.

Having thus described the liquid dispensing device of the present application in specific detail it will be appreciated by those skilled in the art that the same may be susceptible to variations, alterations and/or modifications without departing from the spirit of my invention therein. I therefore desire to avail myself of all variations, alterations and/or modifications as fairly come within the purview of the appended claims.

What I claim as new and desire to protect by Letters Patent is:

1. In a beverage dispenser adapted to be lockingly secured to the open top of a bottle for dispensing measured quantities of fluid therefrom; a main body providing a cylindrical housing co-axially of said bottle, a pouring and venting top on said body having a pouring spout and a venting tube communicating with said housing and an inverted saucer like recess co-axially of and facing said housing, a central bearing unit in said body having a passage communicating with said bottle and a saucer shaped surface co-axially of and facing said housing, a tank having dome-like upper and lower ends journaled between said saucer like recess and said saucer shaped surface for turning movement about the axis of said cylindrical housing, said dome-like upper and lower ends of said tank being ported to register with the pouring spout and venting tube when said tank is turned to tank discharging position and to register with said bottle during non-pouring tank filling position of said tank relative to said bottle, a spring loaded lever means including a manually operated pad exteriorly of said main body and a lever arm interiorly of said housing partially circumscribing said tank, means for pivotally mounting said lever means on said main body for rocking movement about an axis parallel to said cylindrical housing, a yoke on the side wall of said tank, and a rod carried by said lever arm and disposed within said yoke for rocking said tank about the axis of said cylindrical housing between tank filling and tank discharging positions.

2. In a beverage dispenser adapted to be lockingly secured to the open top of a bottle for dispensing measured quantities of fluid therefrom; a main body providing a cylindrical housing co-axially of said bottle, a pouring and venting top on said body having a pouring spout and a venting tube communicated with said housing and an inverted saucer like recess co-axially of and facing said housing, a central bearing unit in said body having a passage communicating with said bottle and a saucer shaped surface co-axially of and facing said housing, a tank having dome-like upper and lower ends journaled between said saucer like recess and said saucer shaped surface for turning movement about the axis of said cylindrical housing, said dome-like upper and lower ends of said tank being ported to register with the pouring spout and venting tube when said tank is turned to tank discharging position and to register with said bottle during non-pouring tank filling position of said tank relative to said bottle, a spring loaded lever means including a manually operated pad exteriorly of said main body and a lever arm interiorly of said housing partially circumscribing said tank, means for pivotally mounting said lever means on said main body for rocking movement about an axis parallel to said cylindrical housing, a yoke on the side wall of said tank, a rod carried by said lever arm and disposed within said yoke for rocking said tank about the axis of said cylindrical housing between tank filling and tank discharging position, and a pressure equalizing vent tube secured to said tank co-axially of its turning axis and extending into said bottle for transferring air from said tank into said bottle during filling of said tank.

3. In a beverage dispenser adapted to be lockingly secured to the open top of a bottle for dispensing measured quantities of fluid therefrom; a main body providing a cylindrical housing co-axially of said bottle, the top of said body having a pouring spout and a pouring vent communicated with said housing and an inverted saucer like recess disposed co-axially of and facing the interior of said housing, a central bearing unit in said body having a passage communicating said housing with said bottle and a saucer shaped surface co-axially of and facing the interior of said housing in spaced relation to said saucer-like recess, a cylindrical tank having dome-like upper and lower ends supported between said saucer like recess and said saucer shaped surface for turning movement about the access of said cylindrical housing, said dome-like upper and lower ends of said tank being ported to register with the pouring spout and venting tube when said tank is turned to pouring position and to register with said passage to said bottle during non-pouring, tank filling position of said tank relative to said bottle, a main vent tube secured to the lower end of said tank co-axially of the cylindrical axis thereof extending through said central bearing unit and into said bottle, a one way valve at the extremity of said main vent tube for blocking flow of fluid from said bottle into the latter during inversion of said bottle, and a pressure equalizing vent between said tank and main vent tube for transmitting air displaced from said tank into said bottle via said one way valve as fluid flows from said bottle into said tank, a spring loaded lever means including a manually operated pad exteriorly of said housing partially circumscribing said tank, means within said body for pivotally mounting said lever means on said main body for rocking movement about an axis parallel to said cylindrical housing, a yoke on the side wall of said tank, and a rod carried by said lever arm disposed within said yoke for rocking said tank about the axis of said cylindrical housing between tank filling and tank discharging position.

4. A beverage dispenser for bottles comprising a main body hollowed to provide an internal cavity having an inverted saucer-like upper end and a saucer shaped lower end, an attaching ring for securing said main body to a bottle, a pouring spout at the upper end of said body communicating with said cavity, a filling port in the saucer shaped lower end of said body, a cylindrical tank in said cavity having ported dome shaped upper and lower ends mounted between said saucer-like upper end and said saucer shaped lower end of said cavity for turning movement about the cylindrical axis of said tank, the port in the lower end of said tank normally having communication with the bottle for receiving fluid therefrom when the latter is inverted, the port in the upper end of said tank being normally out of register with said spout during tank filling operation, manually operated means pivotally mounted on said body including a lever arm extending into the same, a yoke on said tank, and a rod on said lever arm engaged in said yoke for turning said tank for closing the port in the lower end of said tank relative to said bottle and for communicating said tank with said spout.

5. A beverage dispenser for bottles comprising a main body hollowed to provide an internal cavity having an inverted saucer-like upper end a saucer shaped lower end, an attaching ring for securing said main body to a bottle, a pouring spout at the upper end of said body communicating with said cavity, a filling port in the saucer shaped lower end of said body, a cylindrical tank in said cavity having ported dome shaped upper and lower ends mounted between said saucer-like upper end and said saucer-shaped lower end of said cavity for turning movement about the cylindrical axis of said tank, the port in the lower end of said tank normally having communication with the bottle for receiving fluid therefrom when the latter is inverted, the port in the upper end of said tank being normally out of register with said spout during tank filling operation, manually operated means pivotally mounted on said body including a lever arm extending into the same, a yoke on said tank, a yoke engaging rod on said lever arm and movable therewith for turning said tank for closing the port in the lower end of said tank relative to said bottle and for communicating said tank with said spout, and a main vent tube secured to the lower end of said tank co-axially of the cylindrical axis thereof extending into said bottle and having a ball valve at the extremity thereof for sealing off flow of fluid from said bottle into said main vent tube during tank filling operation, a pressure equalizing vent between said main venting tube and said tank for transmitting air from the latter into said main venting tube for passage through said ball valve into said bottle, and a pouring vent associated with said pouring spout for venting said tank to atmosphere when said spout is in register with the port in the upper end of said tank.

6. A beverage dispenser for a bottle comprising a main body providing a housing having a pouring spout at its upper end, a measuring tank in said housing alternately communicable with said bottle and said pouring spout, manual means for moving said tank between beverage receiving and beverage discharging position within said main body, a central bearing unit within said main body for supporting the lower end of said tank for turning movement therein, an inner locking member secured to the lower end of said main body for supporting said central bearing unit therein, said inner locking member having a reduced shoulder and a skirting suspended therefrom providing a cap-like cavity adapted to fit over the mouth and neck of said bottle, resilient sealing means within said skirting for engaging the neck and mouth of a bottle, a presser sleeve mounted on said skirting and keyed thereto for telescopic movement co-axially thereof, and having camming engagement with the lower end of said sealing means, and an attaching ring rotatably attached to the lower end of said main body circumscribing said skirting and presser sleeve and having threaded connection therewith for threadedly advancing said pressure sleeve upon said skirting for compressing said sealing means into sealing engagement with the neck of said bottle.

7. A beverage dispenser for a bottle comprising a main body providing a housing having a pouring spout at its upper end, a measuring tank in said housing alternately communicable with said bottle and said pouring spout, manual means for moving said tank between beverage receiving and beverage discharging position within said main body, a central bearing unit within said main body for supporting the lower end of said tank for turning movement therein, an inner locking member secured to the lower end of said main body for supporting said central bearing unit therein, said inner locking member having a reduced shoulder and a skirting suspended therefrom providing a cap-like cavity adapted to fit over the mouth and neck of said bottle, resilient sealing means within said skirting for engaging the neck and mouth of a bottle, a presser sleeve mounted on said skirting and keyed thereto for telescopic movement co-axially thereof, and having camming engagement with the lower end of said sealing means, and an attaching ring rotatably attached to the lower end of said main body circumscribing said skirting and presser sleeve and having threaded connection therewith for threadedly advancing said pressure sleeve upon said skirting for compressing said sealing means into sealing engagement with the neck of said bottle, and self locking means on said attaching ring for engaging the fluting on said skirting for locking said attaching ring relative thereto.

8. A beverage dispenser for a bottle comprising a main body providing a housing having a pouring spout at its upper end, a measuring tank in said housing alternately communicable with said bottle and said pouring spout, manual means for moving said tank between beverage receiving and beverage discharging position within said main body, a central bearing unit within said main body for supporting the lower end of said tank for turning movement therein, an inner locking member secured to the lower end of said main body for supporting said central bearing unit therein, said inner locking member having a reduced shoulder and a skirting suspended therefrom providing a cap-like cavity adapted to fit over the mouth and neck of said bottle, resilient sealing means within said skirting for engaging the neck and mouth of a bottle, a presser sleeve mounted on said skirting and keyed thereto for telescopic movement co-axially thereof, and having camming engagement with the lower end of said sealing means, and an attaching ring rotatably attached to the lower end of said main body circumscribing said skirting and presser sleeve and having threaded connection therewith for threadedly advancing said pressure sleeve upon said skirting for compressing said sealing means into sealing engagement with the neck of said bottle, self locking means on said attaching ring for engaging the fluting on said skirting for locking said attaching ring relative thereto, and a theft seal cover for said locking means destructible upon gaining access to said locking means for releasing the latter relative to the fluting on said skirting.

9. In a beverage dispenser of the type having a main body confining a measuring chamber alternately communicable with a bottle and a pouring spout; means for sealingly securing said main body to the open mouth of a bottle comprising an inner locking member secured to the lower end of said main body and having a cap like skirting suspended therefrom to fit over the neck and mouth of a bottle, resilient sealing means within said cap-like skirting for engaging the neck and mouth of said bottle, a presser sleever mounted on said skirting and keyed thereto for telescopic movement co-axially thereof, cam means on the lower end of said presser sleeve for cammingly engaging said sealing means, and an attaching ring mounted for rotation on the lower end of said main body and having threaded connection with said presser sleeve for advancing said sleeve upwardly upon said skirting for compressing said sealing means into sealing engagement with the mouth and neck of the bottle engaged thereby.

10. In a beverage dispenser of the type having a main body confining a measuring chamber alternately communicable with a bottle and a pouring spout; means for sealingly securing said main body to the open mouth of a bottle comprising an inner locking member secured to to the lower end of said main body and having a cap like skirting suspended therefrom to fit over the neck and mouth of a bottle, resilient sealing means within said cap-like skirting for engaging the neck and mouth of said bottle, vertical fluting on the external wall of said skirting, a presser sleeve mounted and keyed to the fluted external wall of said skirting for non-rotative telescopic movement co-axially of said skirting, cam means on the lower end of said presser sleeve for cammingly engaging said sealing means, and an attaching ring mounted for rotation on the lower end of said main body and having threaded connection with said presser sleeve for advancing said sleeve upwardly upon said skirting to elevate said cam means toward said sealing means for compressing said sealing means into sealing engagement with the mouth and neck of the bottle engaged thereby.

11. In a beverage dispenser of the type having a main body confining a measuring chamber alternately communicable with a bottle and a pouring spout; means for sealingly securing said main body to the open mouth of a bottle comprising an inner locking member secured to the lower end of said main body and having a cap like skirting suspended therefrom to fit over the neck and mouth of a bottle, resilient sealing means within said cap-like skirting for engaging the neck and mouth of said bottle, vertical fluting on the external wall of said skirting, a presser sleeve mounted and keyed to the fluted external wall of said skirting for non-rotative telescopic movement co-axially of said skirting, cam means on the lower end of said presser sleeve for cammingly engaging said sealing means, and an attaching ring mounted for rotation on the lower end of said main body and having threaded connected with said presser sleeve for advancing said sleeve upwardly upon said skirting to elevate said cam means toward said sealing means for compressing said sealing means into sealing engagement with the mouth and neck of the bottle engaged thereby, and self locking means on said attaching ring for engaging the fluting on said skirting for locking said attaching ring relative thereto.

12. In a beverage dispenser of the type having a main body confining a measuring chamber alternately communicable with a bottle and a pouring spout; means for sealingly securing said main body to the open mouth of a bottle comprising an inner locking member secured to the lower end of said main body and having a cap like skirting suspended therefrom to fit over the neck and mouth of a bottle, resilient sealing means within said cap-like skirting for engaging the neck and mouth of said bottle, vertical fluting on the external wall of said skirting, a presser sleeve mounted and keyed to the fluted external wall of said skirting for non-rotative telescopic movement co-axially of said skirting, cam means on the lower end of said presser sleeve for cammingly engaging said sealing means, and an attaching ring mounted for rotation on the lower end of said main body and having threaded connection with said presser sleeve for advancing said sleeve upwardly upon said skirting to elevate said cam means toward said sealing means for compressing said sealing means into sealing engagment with the mouth and neck of the bottle engaged thereby, self locking means on said attaching ring for engaging the fluting on said skirting for locking said attaching ring relative thereto, and a theft seal cover for said locking means expandable for gaining access thereto for releasing said locking means relative to the fluting on said skirting.

13. In a beverage dispenser of the type having a main body confining a measuring chamber alternately communicable with a bottle and a pouring spout; means for sealingly securing said main body to the open mouth of a bottle comprising an inner locking member secured to the lower end of said main body and having a cap like skirting suspended therefrom to fit over the neck and mouth of a bottle, resilient sealing means within said cap-like skirting for engaging the neck and mouth of said bottle, said skirting having vertical fluting on its external wall, a presser sleeve having internal fluting interlocking with the fluting on said skirting to arrange said presser sleeve for non turning telesecopic movement co-axially thereof, cam means on the lower end of said presser sleeve for cammingly engaging said sealing means, and an attaching ring mounted on the lower end of said main body for fixed turning movement relative thereto, said attaching ring having threaded connection with said pressure sleeve for advancing said sleeve upwardly upon said skirting when said attaching ring is turned in one direction for compressing said sealing means into sealing engagement with the mouth and neck of the bottle engaged thereby, a spring loaded locking pin mounted on said attaching ring for radial movement toward the fluting on said skirting and having a cam end for riding over said fluting when said attaching ring is turned in said one direction and for locking said attaching ring against turning in an opposite direction effecting retraction of said threaded presser sleeve, and a destructible cover on said attaching ring for covering said locking pin against tampering other than when the locking pin is to be released for retracting said threaded presser sleeve upon said skirting.

References Cited in the file of this patent
UNITED STATES PATENTS 2,566,669     Lesnick _____ Sept. 4, 1951
2,678,757     McPhee _____ May 18, 1954